United States Patent
Wu

(10) Patent No.: US 8,849,086 B2
(45) Date of Patent: Sep. 30, 2014

(54) OPTICAL FIBER ATTENUATOR

(71) Applicant: Gloriole Electroptic Technology Corp., Kaohsiung (TW)

(72) Inventor: Chia-Hua Wu, Kaohsiung (TW)

(73) Assignee: Gloriole Electroptic Technology Corp., Kaohsiung (TW)

( * ) Notice: Subject to any disclaimer, the term of this patent is extended or adjusted under 35 U.S.C. 154(b) by 0 days.

(21) Appl. No.: 13/624,037

(22) Filed: Sep. 21, 2012

(65) Prior Publication Data

US 2013/0077930 A1  Mar. 28, 2013

(30) Foreign Application Priority Data

Sep. 26, 2011 (TW) .............. 100217996 U

(51) Int. Cl.
*G02B 6/00* (2006.01)
*G02B 6/38* (2006.01)
*G02B 6/26* (2006.01)
*G02B 6/10* (2006.01)

(52) U.S. Cl.
CPC ............... *G02B 6/10* (2013.01); *G02B 6/3846* (2013.01); *G02B 6/266* (2013.01)
USPC ........................................................ 385/140

(58) Field of Classification Search
CPC ....................................................... G02B 6/266
USPC ........................................................... 385/140
See application file for complete search history.

(56) References Cited

U.S. PATENT DOCUMENTS

| 5,082,345 | A * | 1/1992 | Cammons et al. | 385/60 |
| 6,253,017 | B1 * | 6/2001 | Hartley et al. | 385/140 |
| 6,550,979 | B1 * | 4/2003 | Fleenor et al. | 385/78 |
| 6,726,340 | B1 * | 4/2004 | Visser | 359/872 |
| 2009/0252458 | A1 * | 10/2009 | Baechtle et al. | 385/78 |
| 2011/0188812 | A1 * | 8/2011 | Han et al. | 385/77 |
| 2012/0020625 | A1 * | 1/2012 | Oda et al. | 385/78 |

FOREIGN PATENT DOCUMENTS

EP     2001535 A1 * 12/2008

\* cited by examiner

*Primary Examiner* — Charlie Peng
(74) *Attorney, Agent, or Firm* — Dickstein Shapiro LLP

(57) ABSTRACT

An optical fiber attenuator includes a connector unit, an insert component and an attenuation unit. The connector unit includes a shell member and having a first shell part, and a second shell part that extends from and forms a unitary body with the first shell part, that reduces in cross-section with respect to the first shell part, and that cooperates with the first shell part to define a through hole. A resilient portion is connected to and extends inclinedly and outwardly away from the second shell part and towards the first shell part. The insert component includes an insert body disposed in the through hole, and a trench formed in the insert body. The attenuation unit has one end inserted into the trench and another end inserted into the second shell part.

6 Claims, 4 Drawing Sheets

OPTICAL FIBER ATTENUATOR

CROSS-REFERENCE TO RELATED APPLICATION

This application claims priority of R.O.C application no. 100217996, filed on Sep. 26, 2011.

BACKGROUND OF THE INVENTION

1. Field of the Invention

The present invention relates to an optical fiber attenuator.

2. Description of the Related Art

An apparatus for optical fiber attenuation disclosed in R.O.C Utility Model No. 511714 is illustrated in FIG. 1. The apparatus includes a plug unit 11, an attenuation unit 12, and a socket unit 13. The plug unit 11 includes a shell body 111 in the form of a block and having a hole 110 therein, two locking holes 112 respectively formed on two sides of the shell body 111 (due to the viewing angle, only one locking hole 112 is shown), a fastening portion 113 extending inclinedly away from the shell body 111, and two fastening blocks 114 protrudingly extending from two sides of the fastening portion 113 and adjacent to the shell body 111. The attenuation unit 12 includes a first pin 121 that protrudes into the hole 110 of the shell body 111 and that provides for mounting of an optical fiber, a seat body 122 connected to the first pin 121, and a second pin 123 that is connected to the other end of the seat body 122 and that provides for mounting of an optical fiber. The socket unit 13 includes a base 131 in the form of a block, a protruding portion 132 extending from the base 131, a tube 133 that extends from the protruding portion 132 and that is adapted for insertion of the second pin 123, and two protrusion blocks 134 that protrudes from the tube 133 and that correspond to the two locking holes 112 (due to the viewing angle, only one protrusion block 134 is shown).

By engaging the protrusion blocks 134 with the locking holes 112 of the plug unit 11, the plug unit 11, the attenuation unit 12 and the socket unit 13 are firmly connected together. The fastening portion 113 of the plug unit 11 is pressed to move the two fastening blocks 114 downwards to enable insertion of the apparatus into a communication device (not shown in the figure), and then the fastening portion 113 is released to return the two fastening blocks 114 to their original positions for engagement with the communication device. Thus, the plug unit 11 is firmly connected with the communication device.

However, the plug unit 11 and the socket unit 13 are held by engaging with each other, and such a structure lacks strength. After multiple times of plugging in and unplugging from the communication device, the engagement between the plug unit 11 and the socket unit 13 may start to dislocate and wobble. Such displacement between the plug unit 11 and the socket unit 13 may affect optical transmission.

SUMMARY OF THE INVENTION

Therefore, the object of the present invention is to provide an optical fiber attenuator that is capable of alleviating the above drawback of the prior art.

According to the present invention, an optical fiber attenuator comprises a connector unit, an insert component and an attenuation unit:

The connector unit includes a shell member and a resilient portion. The shell member has a first shell part, a second shell part extending from and forming a unitary body with the first shell part, being reduced in cross-section with respect to the first shell part, and cooperating with the first shell part to define a through hole, and at least one first engaging part formed on the shell member. The resilient portion is disposed outwardly of the shell member, and is connected to and extends inclinedly and outwardly away from the second shell part and towards the first shell part.

The insert component includes an insert body disposed in the through hole of the shell member, a trench formed in the insert body and in spatial communication with the through hole of the shell member, and at least one second engaging part formed on the insert body and capable of engaging with the at least one first engaging part.

The attenuation unit is disposed in the through hole of the shell member, and has one end inserted into the trench of the insert component and another end inserted into the second shell part of the shell member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
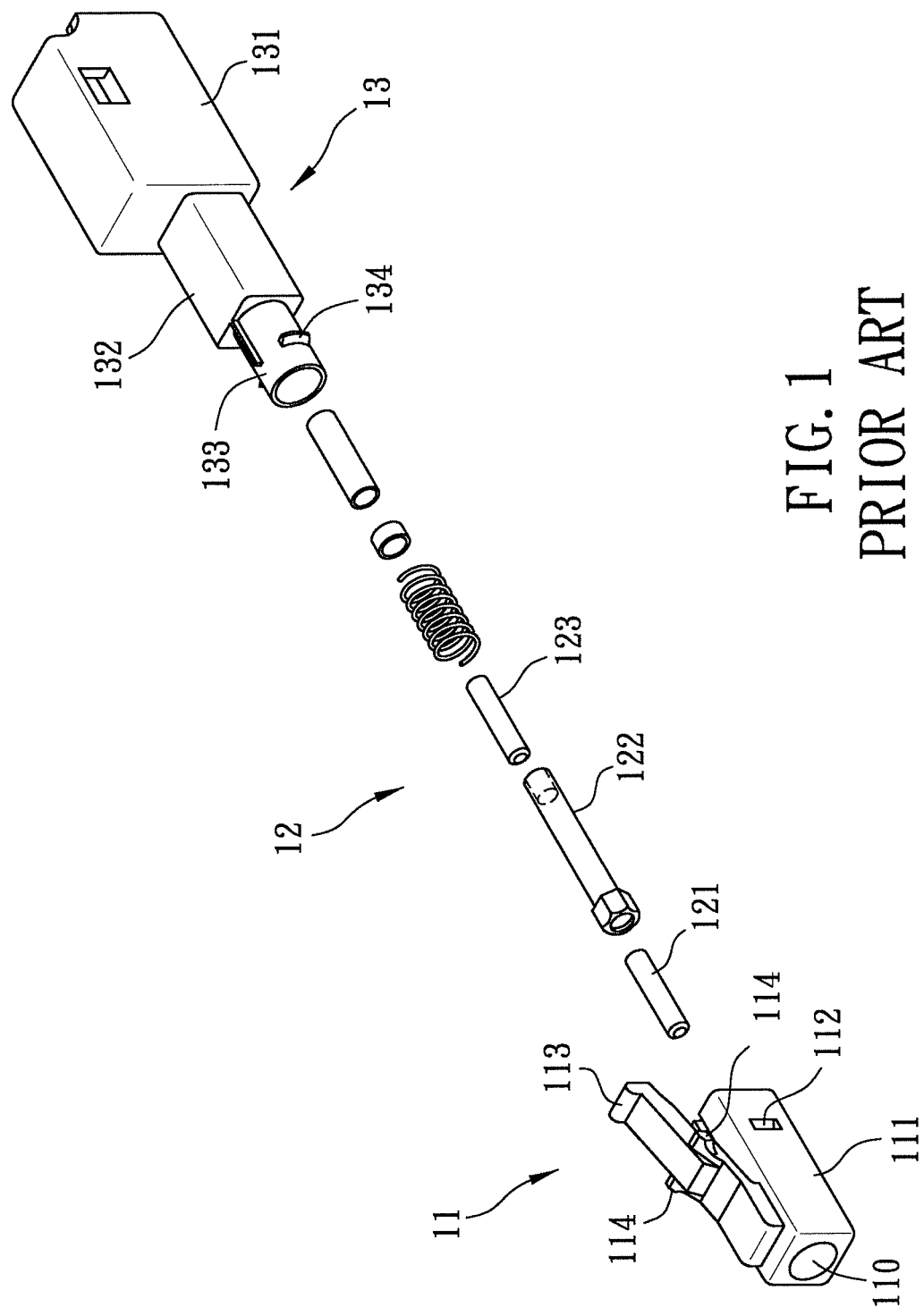
FIG. 1 is an exploded schematic perspective view of an apparatus for optical fiber attenuation disclosed in R.O.C Utility Model No. 511714.
Figure 2:
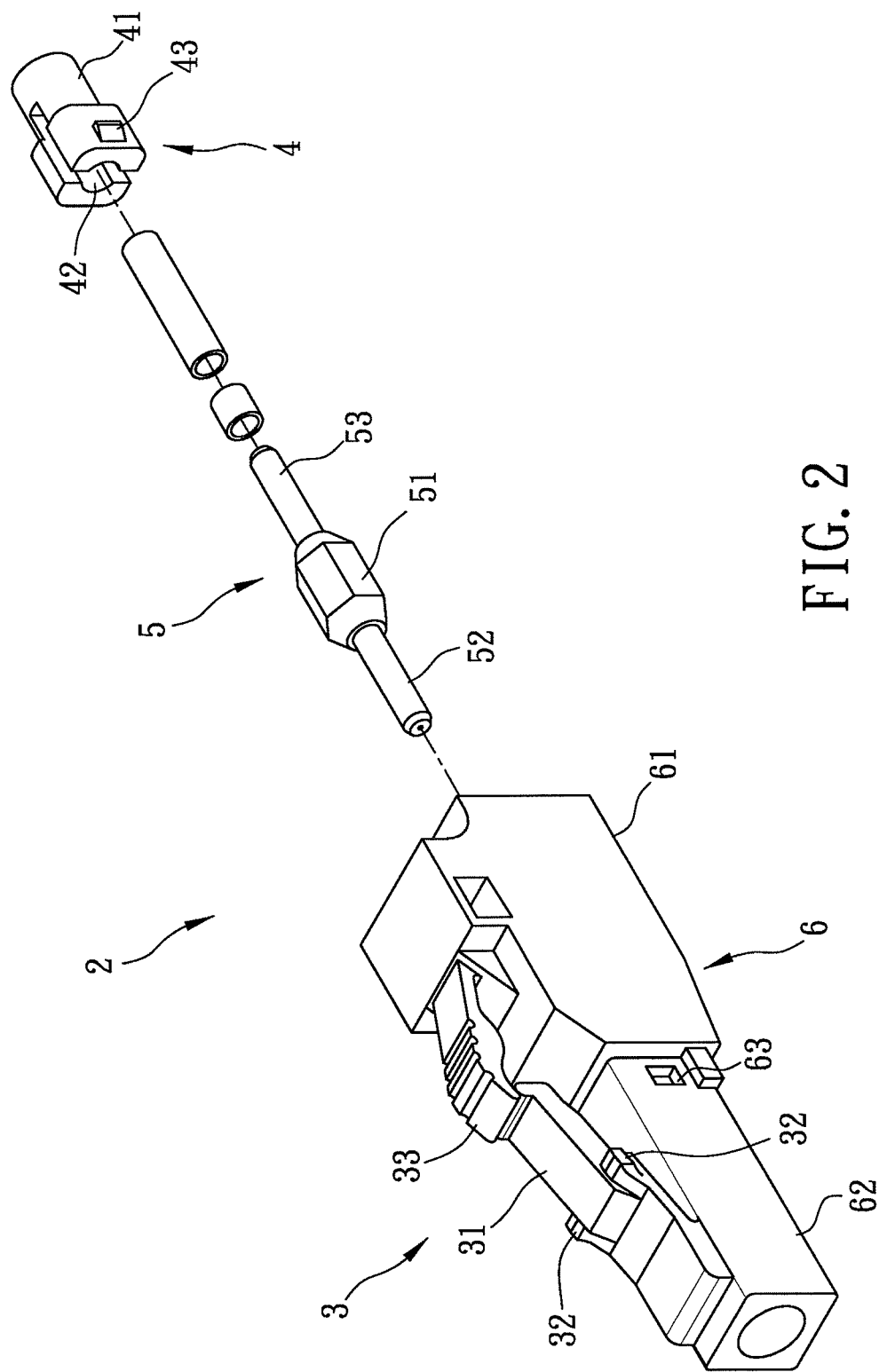
FIG. 2 is an exploded schematic perspective view of the preferred embodiment of an optical fiber attenuator of the present invention.
Figure 3:
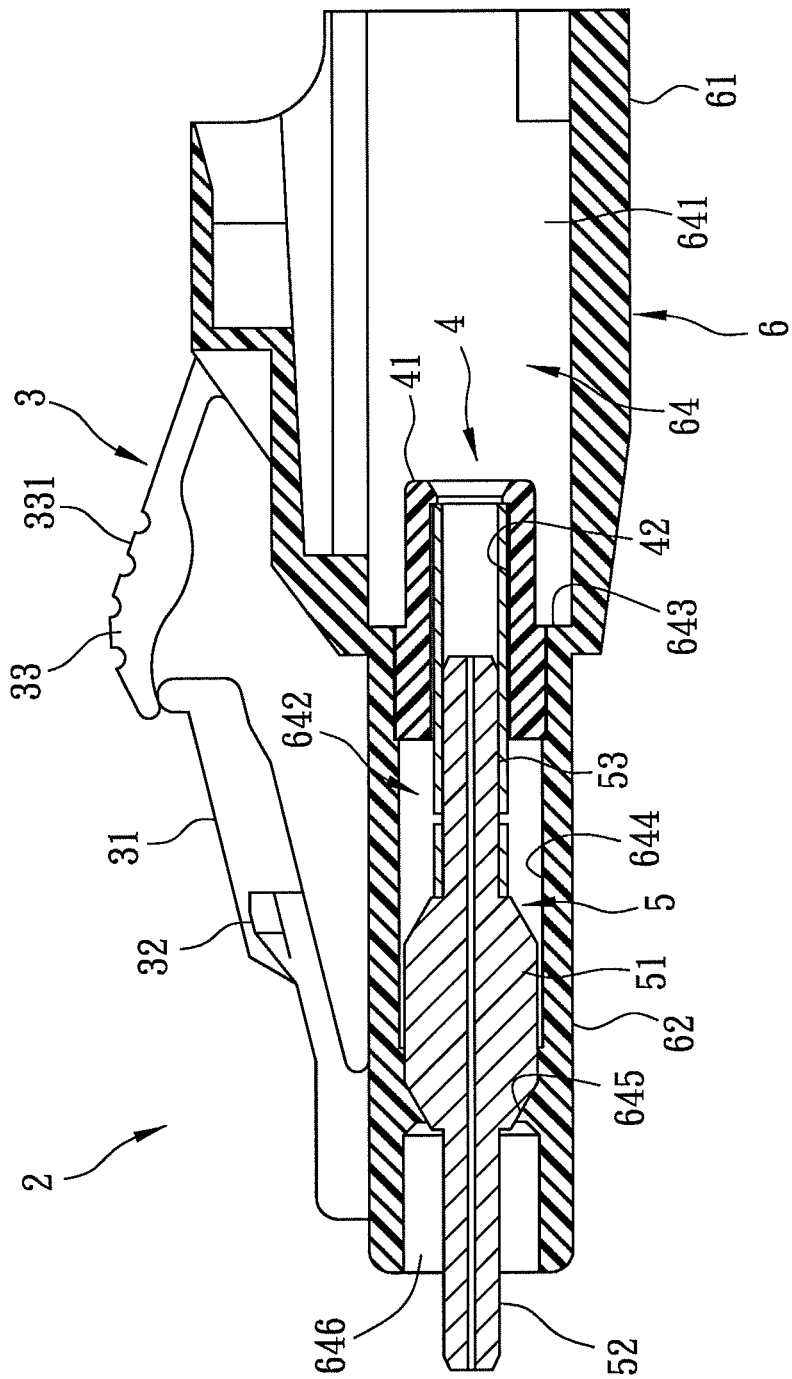
FIG. 3 is a cross-sectional view illustrating the optical fiber attenuator of the preferred embodiment in an assembled state.

Referring to FIGS. 2 and 3, the preferred embodiment of an optical fiber attenuator 2 according to the present invention includes a connector unit 3, an insert component 4 disposed in the connector unit 3, and an attenuation unit 5 disposed in the connector unit 3.

The connector unit 3 includes a shell member 6, a resilient portion 31, two blocks 32, and a press portion 33. The shell member 6 has a first shell part 61, a second shell part 62 and two first engaging parts 63 (only one first engaging part 63 is shown due to the viewing angle). The second shell part 62 extends from and forms a unitary body with the first shell part 61, is reduced in cross-section with respect to the first shell part 61, and cooperates with the first shell part 61 to define a through hole 64. The two first engagement parts 63 are formed on the opposite sides of the second shell part 62 and are formed adjacent to the first shell part 61. The resilient portion 31 is connected to and extends inclinedly and outwardly away from the second shell part 62 and towards the first shell part 61. The two blocks 32 protrude from opposite sides of the resilient portion 31. The press portion 33 is connected to and extends inclinedly and outwardly away from the first shell part 61 and towards the second shell part 62, and is connected to the resilient portion 31. In the preferred embodiment, the press portion 33 has a roughened surface 331 that faces away from the shell member 6, and the roughened surface 331 is formed with a plurality of indentations disposed at regular intervals. The roughened surface 331 may be formed as any kind of surface that provides sufficient traction.

The through hole 64 of the connector unit 3 has a large-diameter hole portion 641 formed in the first shell part 61, and a small-diameter hole portion 642 formed in the second shell part 62. The small-diameter hole portion 642 has a diameter smaller than that of the large-diameter hole portion 641. The shell member 6 further has a shoulder portion 643 at a junction of the large-diameter hole portion 641 and the small-diameter hole portion 642.

The small-diameter hole portion 642 includes a first segment 644 adjacent to and in spatial communication with the large-diameter hole portion 641, a second segment 645 adjacent to and in spatial communication with the first segment 644, disposed opposite to the large-diameter hole portion 641, and having a diameter that is gradually reduced in a direction away from the large-diameter hole portion 641, and a third segment 646 adjacent to and in spatial communication with the second segment 645, disposed opposite to the first segment 644 and having a diameter greater than that of the second segment 645.

The insert component 4 includes an insert body 41 disposed in the through hole 64, a trench 42 formed in the insert body 41 and in spatial communication with the through hole 64, and two second engaging parts 43 formed on two opposite sides of the insert body 41 and capable of engaging with the two first engaging parts 63, respectively (only one second engaging parts 43 is shown due to the viewing angle).

The attenuation unit 5 is disposed in the through hole 64. The attenuation unit 5 includes a pin base 51 disposed in the first and second segments 644, 645, a first pin 52 extending from the pin base 51 and extending through the third segment 646, and a second pin 53 extending from the pin base 51 in a direction opposite to the first pin 52. Each of the first pin 52 and the second pin 53 can be mounted with an attenuation fiber.

Figure 4:
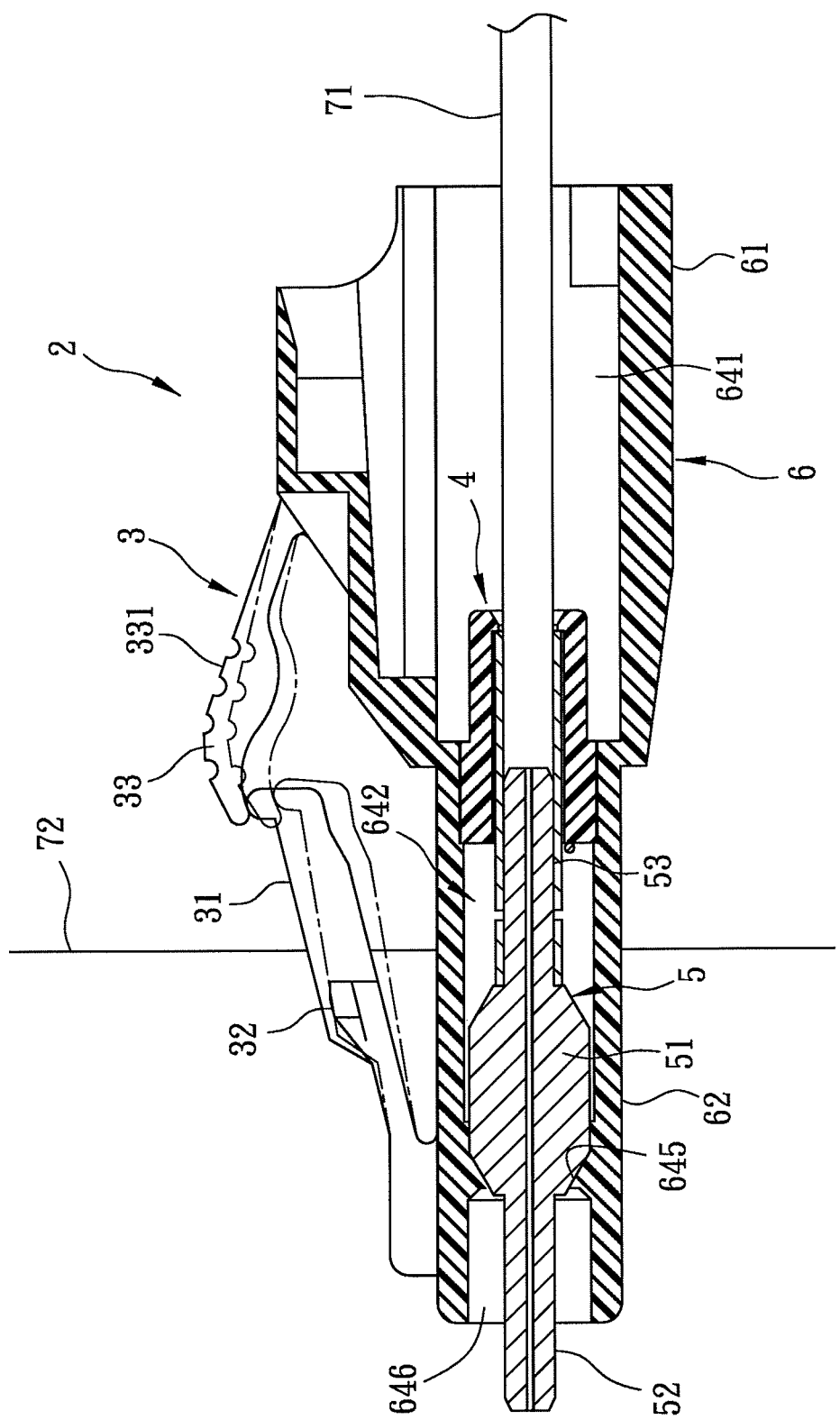
FIG. 4 is a cross-sectional view illustrating the optical fiber attenuator of the preferred embodiment in a state of use.

Referring to FIG. 4, to assemble the optical fiber attenuator 2, the attenuation unit 5 is first inserted into the connector unit 3 through the large-diameter hole portion 641 and extended through the small-diameter hole portion 642. One end of the pin base 51 that is connected to the first pin 52 abuts against the second shell part 62 at the second segment 645, such that a portion of the first pin 52 extends through the third segment 646.

Next, the insert component 4 is inserted into the connector unit 3 through the large-diameter hole portion 641 and into the small-diameter hole portion 642, and the insert component 4 is disposed around the exterior of the second pin 53 of the attenuation unit 5. Accordingly, the second engaging parts 43 (see FIG. 2) engage with the first engaging parts 63 (see FIG. 2), such that the attenuation unit 5 is securely retained in the connector unit 3.

Thereafter, an optical fiber transmission wire 71 is connected to the second pin 53 of the attenuation unit 5, and the press portion 33 of the connector unit 3 is pressed to move the two blocks 32 of the resilient portion 31 downwards, as illustrated by the phantom lines in FIG. 4. Afterwards, the second shell part 62 can be inserted into a communication device 72, and when the press portion 33 is released, the resilient portion 31 shifts upwards to embed the two blocks 32 into the communication device 72. Accordingly, the optical fiber attenuator 2 will be securely connected with the communication device 72. In the preferred embodiment, the optical fiber transmission wire 71 used therein is a LC optical fiber.

In this invention, the second shell part 62 forms a unitary body of the shell member 6 with the first shell part 61. Therefore, even after repeated plugging and unplugging of the shell member 6, displacement and wobbling between the second shell part 62 and the first shell part 61 will not occur and the connection between the press portion 33 and the resilient portion 31 will remain strong. The roughened surface 331 of the press portion 33 can provide sufficient friction force when pressed upon, which aids handling and installation of the optical fiber attenuator 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An optical fiber attenuator comprising:
   a connector unit including:
     a shell member having:
       a first shell part,
       a second shell part extending from and forming a unitary body with the first shell part, being reduced in cross-section with respect to the first shell part, and cooperating with the first shell part to define a through hole, and
       at least one first engagement part formed on the shell member, and
     a resilient portion disposed outwardly of the shell member, and being connected to and extending inclinedly and outwardly away from the second shell part and towards the first shell part;
   an insert component including:
     an insert body disposed in the through hole of the shell member,
     a trench formed in the insert body and in spatial communication with the through hole of the shell member, and
     at least one second engaging part formed on the insert body and capable of engaging with the at least one first engaging part; and
   an attenuation unit disposed in the through hole of the shell member, and having one end inserted into the trench of the insert component and another end inserted into the second shell part of the shell member,
   wherein the through hole of the connector unit has a large-diameter hole portion formed in the first shell part, and a small-diameter hole portion formed in the second shell part and having a diameter smaller than that of the large-diameter hole portion, the shell member further having a shoulder portion at a junction of the large-diameter hole portion and the small-diameter hole portion,
   wherein the small-diameter hole portion includes a first segment adjacent to and in spatial communication with the large-diameter hole portion, a second segment adjacent to and in spatial communication with the first segment, disposed opposite to the large-diameter hole portion and having a diameter that is gradually reduced in a direction away from the large-diameter hole portion, and a third segment adjacent to and in spatial communication with the second segment, disposed opposite to the first segment and having a diameter greater than that of the second segment, and
   wherein the attenuation unit includes a pin base disposed in the first and second segments, a first pin extending from the pin base and extending through the third segment, and a second pin extending from the pin base in a direction opposite to the first pin, the pin base abutting against the second shell part at the second segment, each of the first pin and the second pin to be mounted with an attenuation fiber therein.

2. The optical fiber attenuator as claimed in claim 1, wherein the first engaging part is a hole disposed on the second shell part adjacent to the first shell part, and the second engaging part is a protrusion formed on the insert body.

3. The optical fiber attenuator as claimed in claim 2, wherein the shell member includes two of the first engaging parts respectively disposed on two opposite sides of the second shell part, and the insert component includes two of the second engaging parts to engage the first engaging parts, respectively.

4. The optical fiber attenuator as claimed in claim 1, wherein the resilient portion includes at least one block protruding therefrom.

5. The optical fiber attenuator as claimed in claim 1, wherein the connector unit further includes a press portion disposed outwardly of the shell member, and being connected to and extending inclinedly and outwardly away from the first shell part and towards the second shell part, the press portion being connected to the resilient portion.

6. The optical fiber attenuator as claimed in claim 5, wherein the press portion of the connector unit has a roughened surface that faces away from the shell member.

* * * * *